US008733432B2

(12) United States Patent
LaBrecque

(10) Patent No.: US 8,733,432 B2
(45) Date of Patent: May 27, 2014

(54) SYSTEM AND METHOD FOR ELECTRICAL RESISTIVITY TOMOGRAPHY AND/OR ELECTRICAL IMPEDANCE TOMOGRAPHY

(75) Inventor: Douglas J. LaBrecque, Sparks, NV (US)

(73) Assignee: Multi-Phase Technologies, LLC, Sparks, NV (US)

( * ) Notice: Subject to any disclaimer, the term of this patent is extended or adjusted under 35 U.S.C. 154(b) by 625 days.

(21) Appl. No.: 12/901,308

(22) Filed: Oct. 8, 2010

(65) Prior Publication Data

US 2011/0083838 A1    Apr. 14, 2011

Related U.S. Application Data

(60) Provisional application No. 61/278,569, filed on Oct. 8, 2009.

(51) Int. Cl.
*E21B 43/00*     (2006.01)
*G01V 3/02*      (2006.01)
*G06F 17/50*     (2006.01)

(52) U.S. Cl.
USPC ................................ 166/66; 702/7; 703/6

(58) Field of Classification Search
USPC ............... 166/66, 241.6, 65.1, 250.02; 703/6; 174/84 R; 324/347, 342, 369
See application file for complete search history.

(56) References Cited

U.S. PATENT DOCUMENTS

| 2,400,678 | A | * | 5/1946 | Archie ........................... 324/351 |
| 2,427,950 | A |   | 9/1947 | Henri-Georges |
| 2,749,503 | A |   | 6/1956 | Henri-Georges |
| 2,941,784 | A | * | 6/1960 | Martin ........................... 324/369 |
| 3,305,771 | A |   | 2/1967 | Arps |
| 4,575,681 | A |   | 3/1986 | Grosso et al. |
| 5,162,740 | A |   | 11/1992 | Jewell |
| 5,346,307 | A |   | 9/1994 | Ramirez et al. |
| 6,088,655 | A |   | 7/2000 | Daily et al. |
| 6,131,658 | A | * | 10/2000 | Minear ...................... 166/250.01 |
| 6,220,371 | B1 |   | 4/2001 | Sharma et al. |
| 6,804,625 | B1 |   | 10/2004 | Bryant |
| 7,466,136 | B2 | * | 12/2008 | Chen et al. ...................... 324/369 |
| 7,525,315 | B2 |   | 4/2009 | Fredette et al. |
| 7,673,682 | B2 |   | 3/2010 | Daily |
| 7,759,942 | B2 |   | 7/2010 | Clark et al. |
| 7,986,145 | B2 | * | 7/2011 | Sorbier et al. ................. 324/347 |
| 8,451,136 | B2 | * | 5/2013 | Jaques et al. ................ 340/853.1 |
| 2008/0238427 | A1 |   | 10/2008 | Clark et al. |

OTHER PUBLICATIONS

Development of a Monitoring System for the Jogmec/nrcan/aurora Malllik Gas Hydrate Production of Test Program.
Electrical Resistivity of Tomography at the DOE Hanford Site.

\* cited by examiner

*Primary Examiner* — Daniel P Stephenson
(74) *Attorney, Agent, or Firm* — ATIP Law; Ian Burns

(57) ABSTRACT

In electrical resistivity tomography and electrical impedance tomography, interference effects of the metal well casing can be reduced by disposing measurement electrodes in the form of conductive bands around a region of primary insulation on the well casing. Secondary insulation can be provided longitudinally adjacent the primary insulation to further reduce the interference effects. Parameters of the primary and secondary insulation may be determined using finite element methods. The conductive band electrode can connect to a wire of a multi-strand cable using a novel takeout arrangement. Novel measurement methods are also described.

7 Claims, 6 Drawing Sheets

SYSTEM AND METHOD FOR ELECTRICAL RESISTIVITY TOMOGRAPHY AND/OR ELECTRICAL IMPEDANCE TOMOGRAPHY

CROSS REFERENCE TO RELATED APPLICATIONS

This application claims priority to U.S. provisional patent application Ser. No. 61/278,569, filed Oct. 8, 2009, the contents of which is herein incorporated by reference.

FIELD OF THE INVENTION

The present invention relates to electrical resistivity tomography (ERT) and electrical impedance tomography (EIT). The invention further relates to a systems and methods for fixing electrodes to the outsides of metal well casings for the purpose of making accurate electrical resistivity tomography or Electrical Impedance tomography measurements and to reduce the interference effects of the metal well casing on the measurements.

BACKGROUND

ERT is described as using low frequency electric current which is injected into the ground from electrodes on the surface or in boreholes. In a typical arrangement, the electrodes may be located on a well casing disposed within a borehole. The electrical potential induced by this current is measured using a second pair of electrodes and an automated system is used to collect data for different combinations of transmitting (current) and receiving (potential) electrodes. That is, in ERT, each measurement uses four electrodes; one pair of electrodes serves as the current source and sink and a second pair measures the potential difference between two points. For a system with N electrodes there are approximately $N^4$ different configurations referred to as arrays.

The electrodes are connected to one or more data acquisition systems, typically using multi-conductor, insulated cables. Each electrode is connected to one of the insulated wires within the multi-conductor cable.

For electrical resistivity tomography, the data is described as the ratio of the induced potential over the current flow. The ratio of electrical potential over inducing current is referred to as the transfer resistance and has units of Ohms.

In addition to this data, electrical impedance tomography systems also measure time or frequency variations in the intrinsic electrical properties by measuring one of the following data quantities:

1) the time decay of the induced potential after the inducing current is turned off as either post-turnoff potential over pre-turnoff potential (in units of millivolts per volt) or the post-turnoff potential (in units of milliseconds integrated over a period of time and then divided by the pre-turnoff average potential);

2) the amplitude and phase of the induced potential for a sinusoidally varying current (in degrees or milliradians); or 3) percent frequency effect, which is the change in the transfer resistance of the received signal as the frequency of the inducing current is changed. This is sometimes presented as the change in transfer resistance over the transfer resistance at the lower frequency for measurements collected using a lower frequency one tenth that of the higher frequency.

The listing herein of these quantities does not necessarily imply any limitation on the abilities or goals of EIT systems, but is included merely to offer examples.

As described above, the electrodes are often disposed on a well casing provided within a borehole. The electrodes communicate with sensor equipment on the surface via a cable. To be effective, the electrode within the borehole must be coupled to both the cable and the native formation providing low electrical resistance while at the same time being strongly insulated from the highly conductive metal casing.

What is required are improved systems and methods for reducing the effects of well casing as well as improved systems and methods for connecting electrodes to the cable wires.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to determine the interference effects of a well casing;

the ability to reduce the interference effects of a well casing;

provide a method for determining insulation parameters that produce an acceptable level of casing interference; and provide a cable takeout that can handle the environment of subsurface electrical measurements.

These and other advantages may be realized by reference to the remaining portions of the specification, claims, and abstract.

Brief Description of One Embodiment of the Present Invention

In one aspect, there is provided an arrangement for subsurface electrical measurements. The arrangement may comprise a cable having an exposed metal connector that is electrically connected to at least one internal cable wire of the cable. Primary insulation may be provided on a first portion of a well casing. A conductive band may be affixed to the well casing about the primary insulation such that the first conductive band is electrically isolated from the well casing. Electrical connection between the conductive band and the cable may be made via engagement between the conductive band and the exposed metal connector.

In one aspect, there is provided an arrangement for subsurface electrical measurements. The arrangement may comprise a well casing, a cable, at least one conductive band, and a contact. The conductive band may be provided at least partially around the well casing so that it is electrically isolated from the well casing and provides electrical engagement with at least one wire of the cable. The contact extends from the at least one conductive band and may be configured to contact a sidewall of a borehole when the well casing is disposed in the borehole.

In one aspect, there is provided apparatus for use in electrical resistivity tomography. A well casing may include primary insulation on an exterior of at least one first region of the conductive well casing and secondary insulation on an exterior of at least one second region of the conductive well casing longitudinally adjacent the at least one first region.

In one aspect, there is provided a method for designing a well casing for use in electrical resistivity tomography or electrical impedance tomography. The method may comprise modeling the well casing to determine a surface impedance of the well casing. An interference effect of the well casing on a measurement may be determined using finite element methods. The model may be modified for different parameters of one or more primary insulation zones and one or more secondary insulation zones on the well casing. From the results, one or more parameters of the primary insulation zone and the secondary insulation zone that produce an acceptable level of well casing interference for a measurement can be selected.

In one aspect, there is provided a cable takeout. In the cable takeout, a cable comprising one or more wires with surrounding insulation may have a portion of at least one wire exposed through the insulation. A connection tab electrically connects to the at least one cable wire through the exposed portion. An insulator body encases the exposed portion, the at least one cable wire and a portion of the connection tab leaving a portion of the connection tab exposed through the insulator.

In one aspect, there is provided an electrical resistivity tomography method. In the method, electric current is induced in a first set of electrodes and an electric potential is created between a second set of electrodes for a first period. During the first period, the average magnitude of electric current is measured between the first set of electrodes and average electric potential measured between a second set of electrodes. Electric current continues to be induced in the first set of electrodes. The electric current in the first set of electrodes and the electric potential in the second set of electrodes are measured during a second period. First and second transfer resistances are calculated from the first and second periods and compared.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
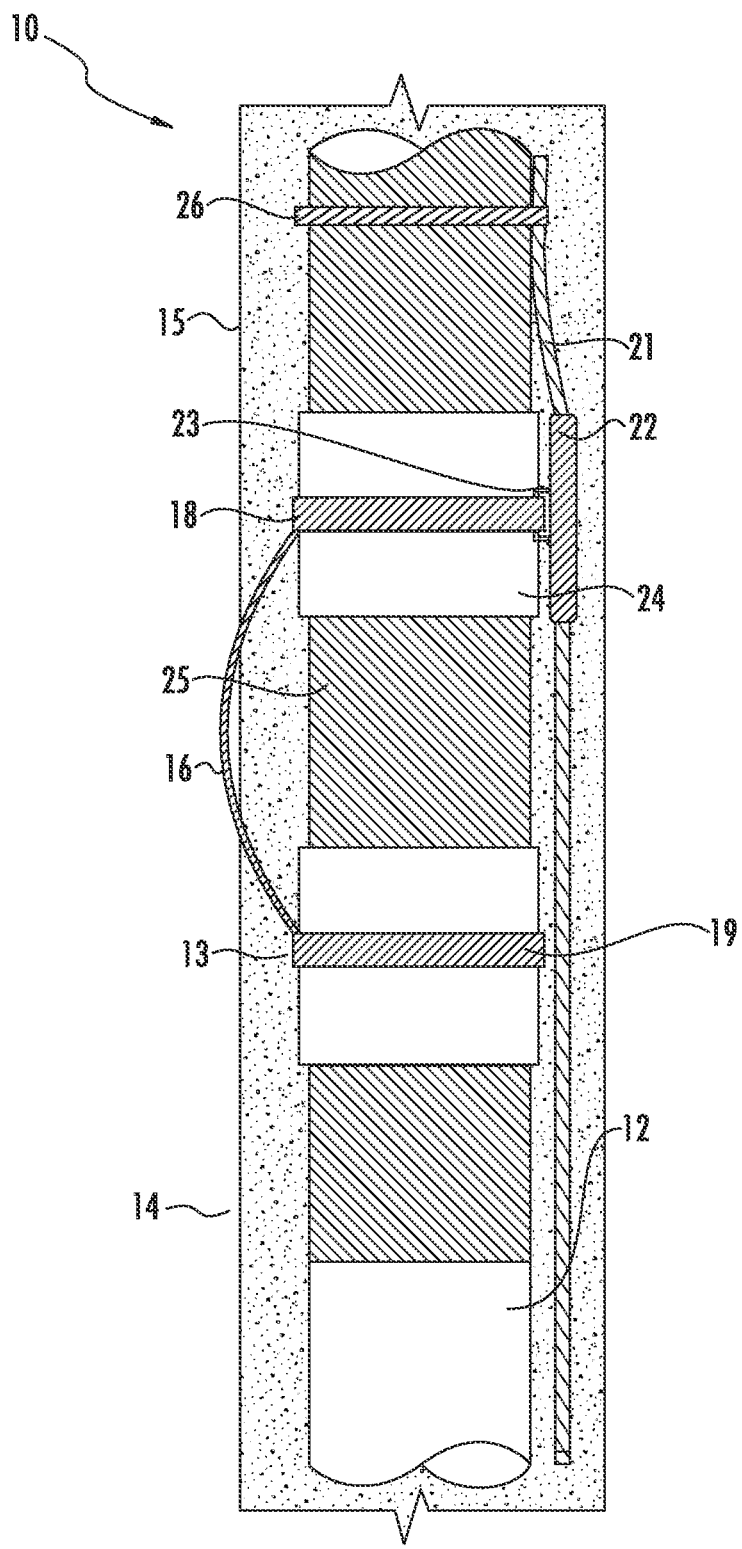
FIG. 1 is substantially a schematic view of one embodiment of an electrical resistivity tomography arrangement.

In FIG. 1, there is shown an electrode system 10, in which a well casing 12 is disposed within a borehole 14 having side walls 15. An electrode 16 is disposed within a grout 13 that seals the well casing within the borehole 14 and serves to increase the conductivity between the electrode 16 and the subsurface environment.

The electrode 16 connects with surface equipment (not shown) via a cable 21. In embodiments of the present invention, a takeout 22 is provided that electrically connects an internal wire or strand of the cable 21 to the electrode 16. Though only one takeout connection is shown, multiple takeouts may be provided and the cable 21 may include multiple strands for connecting to multiple electrodes disposed along the length of the well casing.

In one embodiment, the electrode 16 comprises a conductive band clamp 18 that contacts the takeout 22 and locates the electrode 16 onto the well casing. The conductive clamp 18 may be a metal such as type 316 or type 304 stainless steel, monel metal or other corrosion resistant metal. The metal band clamp 18 is secured over a length of primary insulation 24 which in turn is placed over the casing 12. In one embodiment, the metal band clamp may be secured on the primary insulation 24 using a bolt and nut (not shown) or similar device to allow it to be tightened onto the casing. In one embodiment, additional secondary insulation 25 may be located longitudinally adjacent to the primary insulation 24. Away from the electrodes there may be zone of uninsulated casing 12. In one embodiment, the primary insulation may be a high tech polymer, ceramic or polymer impregnated fiberglass. While such polymers are generally expensive, they provide near perfect insulation between the electrode and the metal well casing. The secondary insulation may be a less perfect but less expensive insulation that extends from the primary insulation zones longitudinally along the well casing 12. Examples of suitable secondary insulation include polymers, surface treatment of the metal casing such as paint or anodizing, tape, or specially designed electrically resistive grout. The secondary insulation may have a specific, allowable amount of exposed metal area referred to as the damage coefficient.

In one embodiment, the conductive clamp 18 may have an enlarged or extending portion that protrudes from the grout 13 to physically contact the sidewall 15 of the borehole 14. In an alternative arrangement shown in FIG. 1, the electrode 16 comprises first and second conductive bands 18, 19 and a centralizer portion 17. The centralizer 17 may be a sprung arcuate portion whose natural resilience serves to hold the conductive bands 18, 19 in place longitudinally over the primary insulation 24 along the well casing 12. In addition, the arc of the centralizer 17 may be configured to protrude from the grout 13 to physically contact the sidewall 15 of the borehole 14. In an alternative arrangement, an electrically conductive grout may be used so that the electrode does not need to protrude from the grout. In this instance the electrode can be a simple metal band around the casing.

The centralizer 17 may be connected to the clamp 18 by various electrical contact means including soldering, welding, brazing, crimping and/or by the use of connectors. In an alternative embodiment, the centralizer may be formed integrally with the clamp 18. In the embodiment shown in FIG. 1, the electrode 16 comprises a second conductive clamp 19 that is also formed around a length of primary insulation 24. Since the second clamp 19 does not make electrical contact with the cable 21, the second clamp 19 does not need to be a conducting material in all embodiments, in which case, the second clamp 19 may not need to be provided on an insulated area of the metal casing 12.

In its broadest form, the particular arrangement of the electrode 16 is not considered pertinent to the present invention and any arrangement which allows the electrode 16 to be electrically connected to the takeout 22, as will be described in greater detail below, is intended to be encompassed within the scope of the present invention.

The first clamp 18 serves to engage the takeout 22 of the cable 21, thereby securing the cable 21 in place relative to the casing 12. Away from the takeout 22, the cable 21 may be additionally secured to the casing 12, for example using polymer cable clamps 26.

Figure 2:
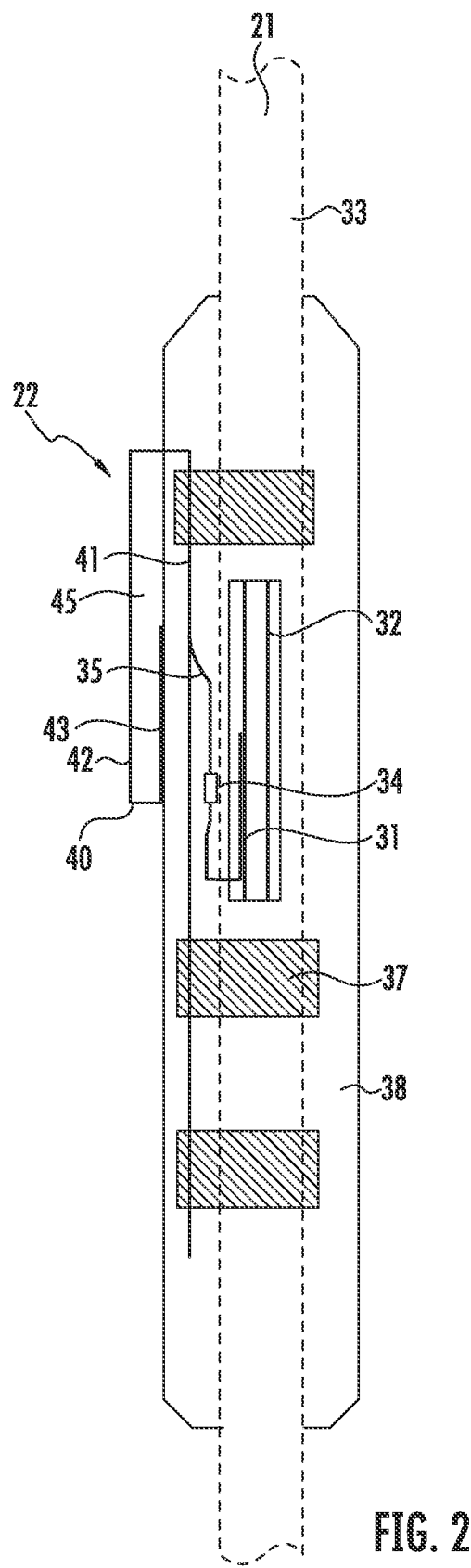
FIG. 2 is substantially a schematic view of an electrical takeout of a cable.

An embodiment of an electrode takeout is depicted in FIG. 2. The electrode takeout provides a method to connect the electrode to one wire in a multi-wire cable while 1) maintaining electrical isolation between that wire and the other wires, 2) maintaining the physical integrity of the cable and 3) preventing the ingress of borehole fluids into the interior of the cable. With reference now to FIG. 2, there is shown a cross-section view of the takeout 22. The cable 21 contains multiple insulated wires 31, 32. The cable is provided with a cable sheath 33 which provides insulation around and between the multiple cable wires 31, 32. An opening 34 in the cable sheath 33 provides an exposed portion that exposes one or more of the cable wires 31, 32. A connector wire 35 connects between one of the cable wires 31 and a connection tab 40. The connector wire 35 may be, for example, a short wire or wire braid and may be brazed, spot welded or otherwise electrically coupled at one end to the connection tab 40. The other end of the connector wire 35 is connected to one of the wires 31 from the cable 21 through the opening 34 by means of a suitable connection such as by soldering, brazing, or using a crimp connector. The connection tab 40 may be held to the multi-conductor cable 21 using one or more polymer or metal strain relief bands 37. An insulating body 38 of the takeout encases the opening 34 of the cable 21, the connector wire 35 and a portion 41 of the connection tab 40, leaving another portion 42 of the connector tab exposed. The insulating body 38 may be formed by molding it in place over the cable 21 and tab 40. In various embodiments, the body 38 can be molded from epoxy, high-temperature epoxy, silicon rubber, polyurethane or other electrically insulating polymer compounds. Other suitable materials for the body 38 and methods for forming the body 38 will be apparent to a person skilled in the art.

It can be seen from the above, that the takeout 22 provides a means for making electrical contact to the cable 21 via the connection tab 40 while providing a means for providing both insulation, protection and strain relief to the cable wires 31. The size and exact shape of the electrode takeout 22 may vary with the size of the cable, casing and electrode.

Figure 3:
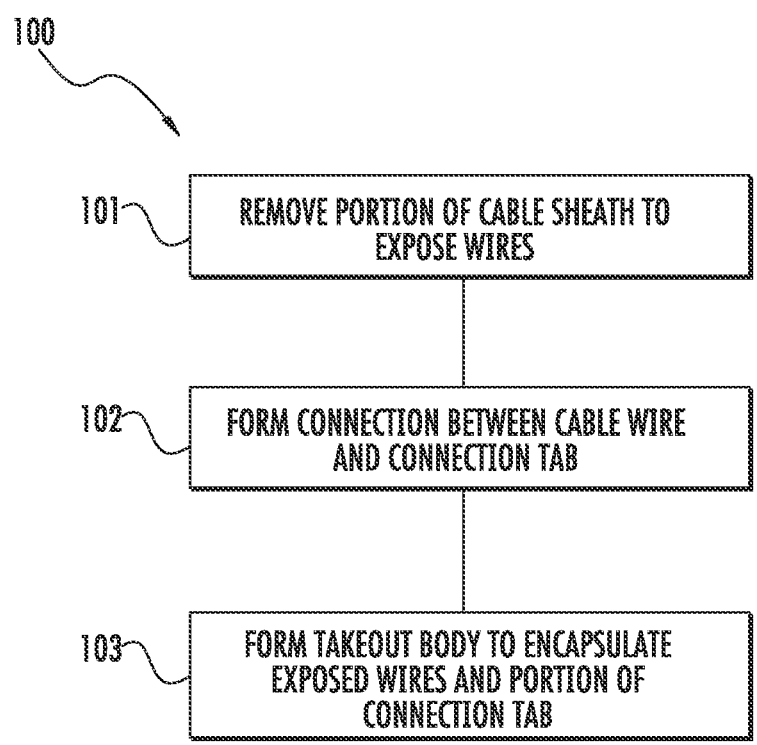
FIG. 3 is a method for forming the electrical takeout of FIG. 2.

The takeout 22 may be formed by a process depicted in the flowchart 100 of FIG. 3. At step 101, a portion of the sheath 33 of the cable 21 may be removed to expose one or more of the internal wires 31 of the cable 21. A connection can then be made between the internal wire 31 and the connection tab 40 (step 102). In one embodiment, the connection may be made via a connector wire 35 that connects at a first end to one of the cable wires 31, such as by soldering (step 102). The other end of the connector wire 35 may be fixed to the connection tab 40, for example by soldering or by the use of crimp connectors. In alternative embodiments, the connector wire may be eliminated, with the cable wire 31 being connected directly to the connection tab 40. The polymer body 38 may then be molded around the arrangement so that the exposed portion of the cable wires 31, the connector wire 35 and a portion 41 of the connection tab 40 are encapsulated (step 104). A portion of the connection tab 42 is left exposed to allow electrical connection from the takeout 22 to the electrode via the metal clamp(s) 18.

The connection tab 40 may be formed to provide a mechanical engagement with the band 18 so that contact between the tab 40 and the band 18 also provides an electrical contact. In the embodiments shown, the tab 40 is bent in a manner to define a gap 45 that receives the band 18 through an opening 46. The tab may have a parallel first 41, second 42 and third 43 portions. The first portion 41 is encased in the polymer body 38 of the takeout such that the third portion lies adjacent the polymer body. A gap 45 is defined between the third portion 43 and the second portion 42. The tab 40 is resilient to allow the electrode clamp 18 to be received through an opening between the third portion 43 and the polymer body 38 and into the gap 45. The third portion extends inward to the gap 45 and serves to retain the band 18 within the gap 45.

The gap 45 may be dimensioned to be of a similar width as the band 18 so that when the band is received within the tab 40, contact between the band 18 and the tab 40 is ensured, thereby ensuring electrical contact is made. Other arrangements of the tab 40 may be provided that allow a mechanical and electrical connection to be made to the electrode. While a mechanical connection is preferred, an electrical connection between the tab and the electrode may be made by soldering or otherwise fixing the tab to the electrode or an intermediate connector such as the clamp.

In order to provide strain relief to the tab 37, one or more insulating clamps may be provided around the first portion of the tab that firmly hold the tab against the cable. The insulating clamps may be made of a material such as a polymer.

There can be difficulty in providing a perfect, unflawed, electrically insulating layer on metal well casings. Flaws occur due to minute manufacturing imperfections in the coating of the casing; damage of the coating during installation and cementing operations especially at the joints between casing segments; deterioration of coatings in the presence of borehole fluids including petroleum and other solvents; and various clamping devices such as centralizers and cable protectors, that are fixed to the outside of the casing. A solution includes the use of the primary and secondary insulation as described above. The solution may also include the use of a non-conductive grout and/or designing electrodes to contact the formation outside the ground and away from the casing.

In addition to these aspects, finite-element, finite difference modeling or analytical solutions can be used to choose array types that minimize the effects of casing leakage. Furthermore, the data can be interpreted using a modified finite-element approach that includes a partially insulated well casing coupled to the subsurface.

Finite Element Models

The interpretation of ERT data requires sophisticated forward and inverse modeling routines. The term forward modeling indicates the process of estimating data values given a two or three dimensional distribution of electrical properties within the earth. Inverse modeling is the process of finding an optimal three-dimensional distribution of earth resistivity structures that is consistent with the observed data and any geological constraints.

For the present invention, the forward model is derived by assuming that the electrical potentials follow the Poisson Equation:

$$\nabla \cdot \sigma \nabla V = I$$

where
V is the electrical potential
σ is electrical conductivity, the inverse of resistivity and
I is the distribution of electric current sources.

An approximate solution to the above equation can be found using the finite-element method. In the finite-element method, the resistivity of a foreground region—the region between the boreholes—along with the surrounding background region, is divided into a series of elements. These elements generally have simple geometric shapes such as tetrahedra or hexahedra. The electrical properties within an element are assumed to be constant but vary from element to element. The size of the elements can also vary from element to element. In the foreground region, the elements are all about the same size. This size is usually based on the spacing of the electrodes along the boreholes; typically the dimension of a foreground element is about one half to one quarter the electrode spacing. The electrical potentials are calculated at nodes that are located on the corners of the elements.

The well casing may also be incorporated into the forward model. The well casing is characterized by its outer diameter; thickness; casing electrical resistivity; connection to surface piping and other casings; and surface impedance. The surface impedance is in turn characterized by the presence of non-conductive coatings and electrochemical effects. These electrochemical effects vary with the type of metal, age and history of the casing, and the chemistry of the surrounding cement and pore fluids.

Generally, the casing can be modeled as two domains. The first domain is the exterior of the casing where the electrodes are located. This domain can be modeled using the special shaped elements that have a circular portion of the borehole removed from the element. The second region, the interior of the casing is modeled using a series of thin cylindrical elements. In the common case where the resistivity of the casing is much smaller then the resistivity outside the casing, and the radius of the borehole is much smaller than the element size, the electrical potential can be assumed axisymmetric inside and outside the casing and the effects of the excluded zone ignored allowing the use of standard shaped elements to approximate the region outside the casing. A second special case occurs when the casing length is short and the casing is connected to external piping such that the potential is nearly zero on the interior of the casing. In this situation the interior of the casing can be modeled as a Dirichlet boundary.

The forward finite-element model is used in the design and optimization of the data collection, including the design of the primary and secondary insulation zones to produce an acceptable level of interference due to the well casing. In Electrical Resistivity Tomography (ERT) each measurement uses four electrodes; one pair of electrodes serves as the current source and sink and a second pair measures the potential difference between two points. For a system with N electrodes there are approximately $N^4$ different configurations referred to as arrays. However it can be shown that within this large set of arrays only about $N^2/2$ are independent. An optimal set of arrays can be determined by searching through the possible arrays and selecting those arrays that are highly sensitive to resistivity within a target zone and insensitive to changes in the surface impedance of the well casings.

Using forward modeling it is possible to estimate the sensitivity of the electrical potentials with respect to changes in the conductivity of one of the elements in the finite-element mesh or in the surface impedance of a well casing. The sensitivity can be determined efficiently using the adjoint formulation.

Forward modeling also serves as the basis for the inverse modeling used to create images of subsurface resistivity. Inverse modeling begins by forming an initial estimate of the resistivity distribution, often a layered earth model derived from well logs, creating a forward model based on this distribution, comparing this forward model with the observed data values, and then using an iterative algorithm such as Occam's inversion to find a resistivity distribution which provides a better fit to the data, fits any predetermined constraints, and meets additional optimization criteria.

When electric current is applied to the casing the surface impedance varies with both the density of the current flow and the frequency of the inducing current. Because of this non-linearity, it is generally necessary to invert for the surface impedance as well as the 3D distribution of electrical resistivity around the casings. It also possible to test the integrity of the non-conductive coatings by measuring the non-linearity and/or the frequency dependence of field data. Nonlinearity measures the variation of the surface impedance with current density. It can be estimated by making measurements at two or more different current levels. The frequency dependence can be measured either by making measurements at two or more base frequencies or by induced polarization effects which measure the phase shift or time lag of the electrical potential versus the current injection.

Figure 4:
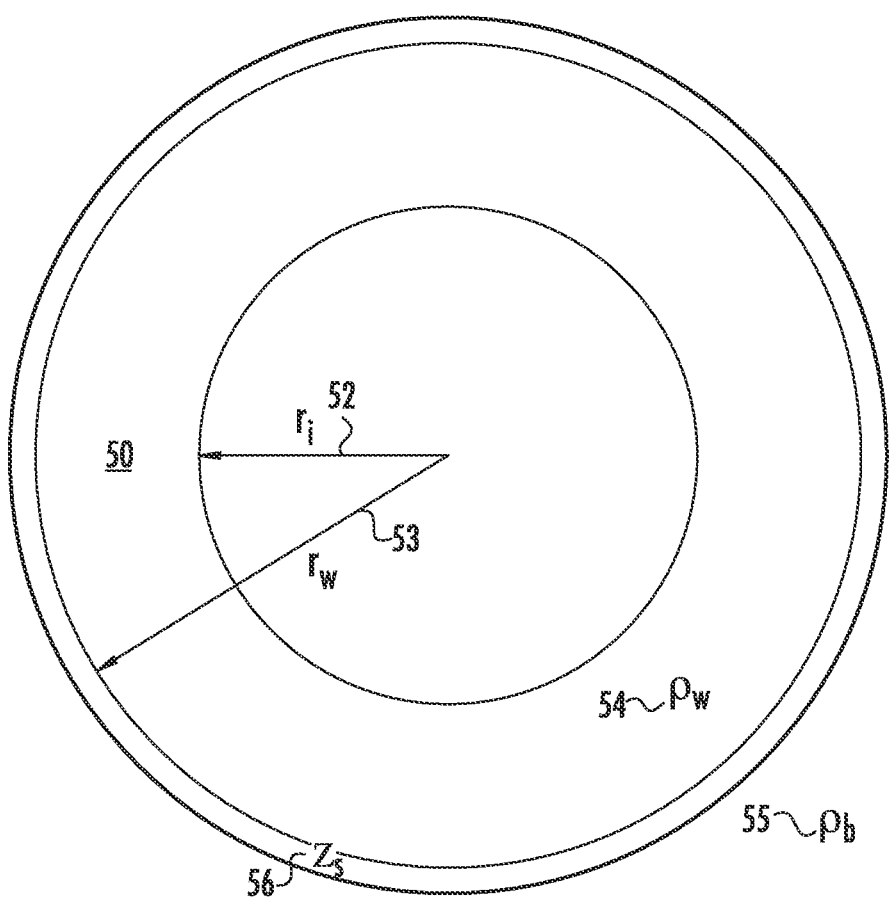
FIG. 4 substantially depicts a first model of a cross section of a well casing.

FIG. 4 shows a cross-section view of the well casing showing the casing 50 with inner radius $r_i$ (52), outer radius $r_w$ (53) and a resistivity of $\rho_w$ (54). The region outside the casing has a resistivity of $\rho_b$ (55). The thin layer of insulation and electrochemical effects at the surface of an exposed area of metal well casing can be characterized as a surface impedance $Z_s$ (56). In the design of wells and survey arrays it is useful to estimate the effects of exposed areas or damaged insulation. For the purpose of estimating the effects of exposed areas or damage to insulation, the electrochemical surface impedance is often assumed be zero. To model non-damaged areas of the insulated casing the surface impedance is assigned a very large, but finite value for example $10^6$ Ohms m$^2$.

For damaged insulation, an average value of surface impedance is estimated. The average value of surface impedance depends on the size, shape, and number of defects in the insulation and the resistivity of the media outside the casing. In one example, it is assumed that there are N defects per square meter of area of the outside of the casing, that each defect is circular in shape, and has a radius of $r_d$. Furthermore, the number of defects per square meter, N, is small; the radius, $r_d$, of the defects are much smaller than the casing diameter; and the distance from defect to defect is large compared to the radius of a defect. The average surface impedance $Z_a$ can be approximated as:

$$Z_a = \frac{\rho_b}{2\pi N r_d}$$

Well casings can be modeled using an axi-symmetric finite-element, steady-state modeling algorithm. The finite-element algorithm allows modeling of the electrical potential or potential differences due to one or more current sources along the borehole. The resistivity of the medium around the borehole can vary both vertically (parallel to the borehole) and radially (perpendicular to the borehole).

Figure 5:
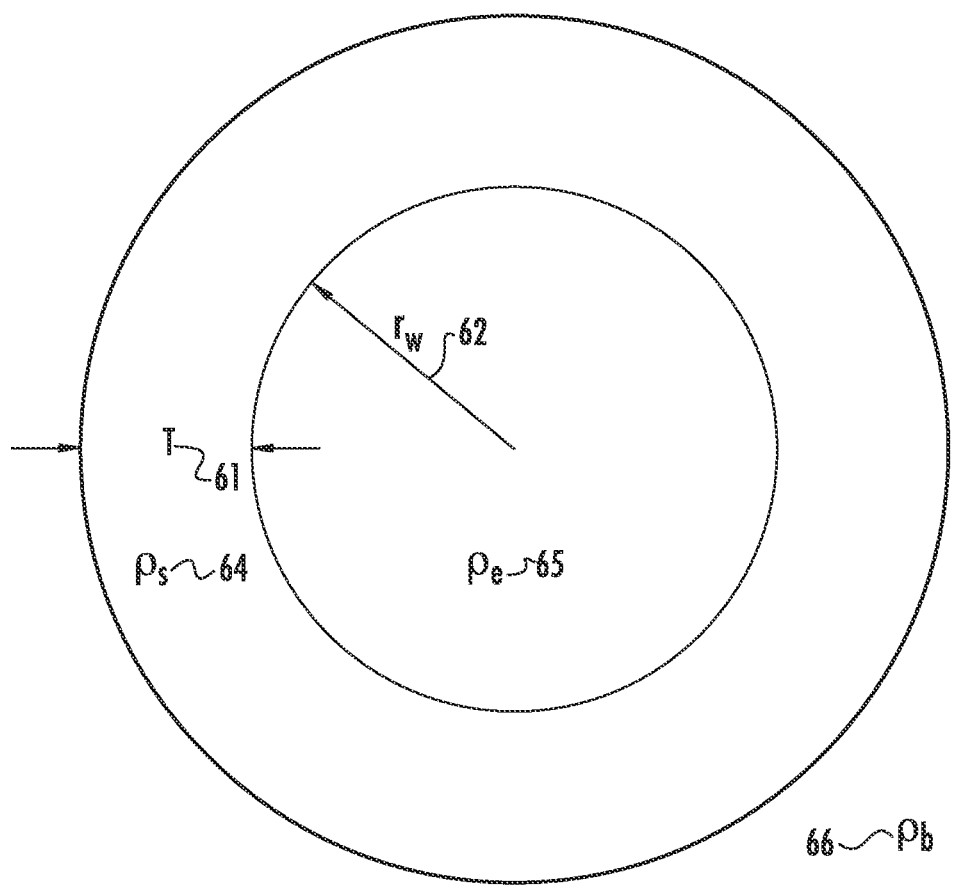
FIG. 5 substantially depicts a second model of a cross section of a well casing.

FIG. 5 shows a cross-section view of the casing model. The surface impedance can be modeled using the principle of equivalence that states that a thin layer with resistance much higher than the surrounding region can be modeled with a layer with a greater or lesser thickness but same resistivity x thickness product. Therefore, the surface impedance, $Z_a$ is modeled using a layer with a thickness T (61). The magnitude of T must be smaller than $r_w$ (62). The resistivity of equivalent boundary impedances layer is $\rho_s$ (64) and is given by:

$$\rho_s = Z_a T$$

For example T is typically 10% to 33% of $r_w$.

Generally, the modeling of the well casing can be simplified by modeling the casing as a solid cylinder of radius $r_w$ (62) and resistivity $\rho_e$ (65) where:

$$\rho_e = \frac{\rho_w(r_w^2 - r_i^2)}{r_w^2}$$

The above described casing models can be incorporated into finite-element modeling in the design phase to determine the lengths and materials for the primary and secondary insulation that produce acceptable levels of well casing interference in the measurements. That is, calculated surface impedance values of the well casing for different thicknesses and lengths of primary and secondary insulation zones, as well as different resistivities of the insulation type can be used in the forward model based on Poissons equation described above. Parameters of the primary and secondary insulation zones that produce acceptable levels of interference can then be selected based on the modeling outcomes and well casings designed to the selected parameters. These casing models and surface impedance values may also be used in the field data to take into account the effects of the well casing on the measurements.

Figure 6:
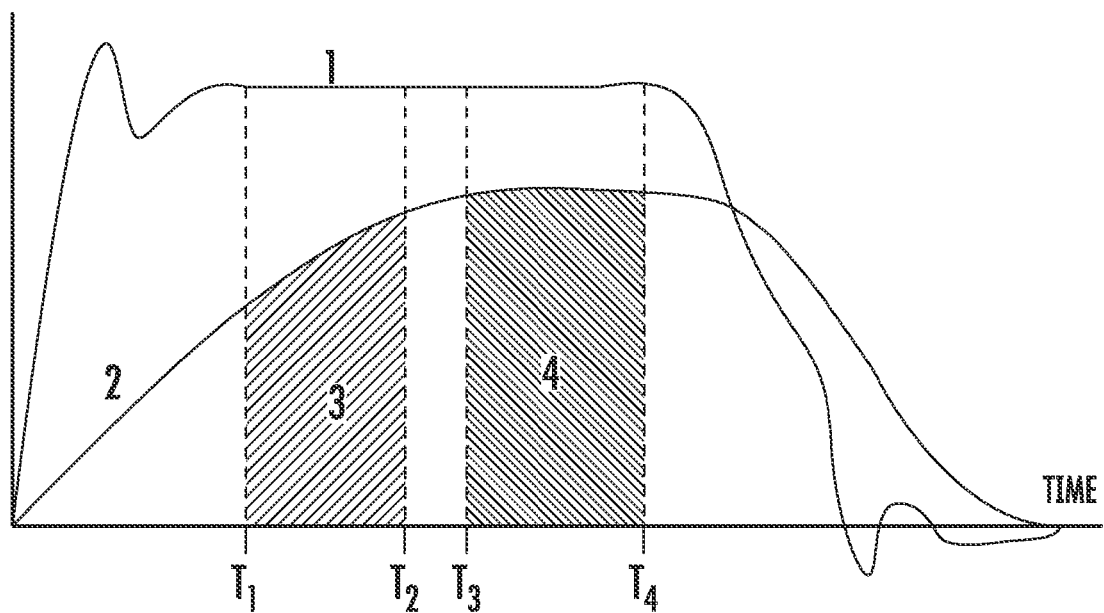
FIG. 6 substantially depicts a waveform during an ERT measurement.

A method for ERT measurement will now be described. In electrical resistivity tomography, the data, referred to as transfer resistances, are measured as the ratio of observed potential between a pair of electrodes divided by the magnitude of the current flow induced in a second pair of electrodes. Transfer resistances are typically interpreted under the assumption that the data is independent of time/frequency. A number of effects due to subsurface structures and instrumentation can violate this steady-state assumption. The violation of this assumption is a concern as it may impact the validity of data interpretation. In collection of ERT data in the presence of metal well casing, the electrochemical interface can be strongly frequency dependent. Thus, a new method is given herein for assessing the time/frequency dependence of resistivity using measurements of resistivity at different time intervals. Consider the following simplified case in which an electronic switching device is used to turn on the electric current flow between a first pair of electrodes located in the subsurface. FIG. 6 shows the voltage waveform 1 and the current waveform 2. At some time after the electric current is turned on, the average value of electric current flow is measured during the interval between times $t_1$ and $t_2$ (3). During the same time interval, the average value of potential difference is measured between a second pair of electrodes. A value of transfer resistance is estimated from these two measurements. The current flow is allowed to continue. Then, at a second time interval $t_3$ to $t_4$ (4), measurements are made of both the average current flow and the average potential between the pair of electrodes. A second value of transfer resistance is estimated from these data. The two pairs of transfer resistances are compared either by taking the difference or the ratio of the measures of transfer resistance. Additional estimates of transfer resistance can be made. The times, t1, t2, t3, and t4 can range from a few tens of milliseconds to tens of seconds. In a typical application, $t_1$ would be about 1 second, $t_2$ and $t_3$ about 2 seconds and $t_4$ about 3 seconds. This example is for illustration. In practice, the waveform shown in FIG. 6 is repeated several times, each time alternating the polarity of the current flow and potential. The repetition rate of the waveform depends on the times t1 through t4 but may range from a few tens of Hertz to as low as 0.001 Hertz. Values of transfer resistance are estimated by taking a weighted average of the values measured from the repeated waveforms.

The electrical resistivity (ER) (electrical potentials measured while current is being applied to source electrodes) and induced polarization (IP) (electrical potentials collected after discontinuing the applied current) may be collected at multiple frequencies or multiple delay times for the same base frequency. The variations of ER and IP with time or frequency provide a method to evaluate the relative amount of casing interference effects. The underlying theory of ER assumes that the measurements are essentially independent of time and frequency and these variations are indicative of and proportional to errors within the interpretation of the data. In typical ER and IP measurements of subsurface media such as sedimentary rocks in water and oil reservoirs, the time and frequency variations are small often less than one percent of the data values. Thus large variations in data with time or frequency are indicative of the strongly time/frequency dependent surface impedance of the well casing.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. An arrangement for subsurface electrical measurements comprising:
    (A) a cable comprising an exposed metal connector that is electrically connected to at least one internal cable wire of the cable;
    (B) a metal well casing;
    (C) primary insulation on at least a first portion of the well casing; and
    (D) a first conductive band;
    (E) wherein the first conductive band is affixed to the well casing about the primary insulation such that the first conductive band is electrically isolated from the well casing;
    (F) wherein the first conductive band electrically and physically engages the exposed metal connector; and
    (G) wherein the cable comprises a takeout that electrically connects to the at least one internal wire of the cable, the takeout comprising a clip that electrically engages the first conductive band.

2. The arrangement of claim 1 comprising a conductive contact that extends from the first conductive band and is configured to contact a formation when the arrangement is disposed in the formation.

3. The arrangement of claim 1 comprising secondary insulation on at least one second portion of the well casing longitudinally adjacent the first portion, wherein one or more parameters of the primary insulation are different from one or more parameters of the secondary insulation.

4. An arrangement for subsurface electrical measurements comprising:
(A) a well casing;
(B) a cable;
(C) at least one conductive band provided at least partially around the well casing, the conductive band being electrically isolated from the well casing, the conductive band providing electrical engagement with at least one wire of the cable; and
(D) a contact extending from the at least one conductive band and configured to contact a sidewall of a borehole when the well casing is disposed in the borehole, the contact comprising an arcuate band that arcs from the first conductive band to a second band provided at least partially around the well casing, the arcuate band being the most radially projecting component of the arrangement.

5. The arrangement of claim 4 wherein the well casing comprising at least one first region of primary insulation on an exterior of the well casing, wherein the conductive band is disposed about the primary insulation.

6. The arrangement of claim 5 comprising at least one region of secondary insulation disposed longitudinally adjacent the at least one first region, wherein one or more parameters of the secondary insulation are different from one or more parameters of the primary insulation.

7. The arrangement of claim 4 wherein the cable comprises a takeout that electrically connects to the at least one wire of the cable, the takeout comprising a clip that electrically engages the conductive band.

\* \* \* \* \*